United States Patent [19]
van Soestbergen et al.

[11] 3,911,975
[45] Oct. 14, 1975

[54] DEVICE FOR LOADING TANK CARS

[75] Inventors: Hans van Soestbergen; Pieter van Toor, both of Rotterdam, Netherlands

[73] Assignee: Shell Oil Company, Houston, Tex.

[22] Filed: Mar. 28, 1974

[21] Appl. No.: 455,829

[30] Foreign Application Priority Data
Apr. 4, 1973 Netherlands............. 7304651

[52] U.S. Cl. ............. 141/95; 141/232; 141/387
[51] Int. Cl.² .................. B65B 1/30; B67C 3/02
[58] Field of Search ........... 141/95, 272, 279, 284, 141/231–233, 198, 52, 387, 388, 389, 94, 59, 285, 302, 392, 93

[56] References Cited
UNITED STATES PATENTS
3,753,453  8/1973  Madden et al..................... 141/284

Primary Examiner—Houston S. Bell, Jr.

[57] ABSTRACT

There is disclosed a device for loading tank cars which includes a vertically movable carrier for a loading pipe with the carrier supported by a trolly system movable horizontally in two directions perpendicular to each other with the carrier for the loading pipe being provided with means to regulate the pressure of the carrier against the loading port of the tank car, means for locking the carrier pipe, means for sensing the liquid level in the tank car, means for stopping the flow of liquid when a predetermined level is reached and means for carrying vapors exhausted from the tank car away to a vapor recovery system.

4 Claims, 2 Drawing Figures

DEVICE FOR LOADING TANK CARS

BACKGROUND OF THE INVENTION

In loading road or rail tank cars, hereinafter referred to as tank cars, difficulty is encountered in many respects. It is dangerous and inefficient to have personnel climbing on the tank cars to hold and adjust hoses; hoses are dropped and become dirty; vented vapors escape to the atmosphere, and tanks overflow if not carefully watched which both wastes liquid and creates a pollution problem.

THE INVENTION

The invention relates to a system for loading tank cars which obviates the problems set forth above. More particularly, the invention relates to a loading system with the aid of which a large number of different liquid products may be loaded, as desired, into a tank car.

In similar known systems a loading hose having a loading pipe on the end thereof is provided for each liquid product. In loading a tank car, operating personnel select the correce loading hose and loading pipe for the desired liquid product and place the loading pipe in the loading manhole of the tank car. The object of the invention is to provide an improved embodiment of such a system.

The device of this invention includes a loading pipe carrier in which a loading pipe may be detachably fixed, the loading pipe carrier being so mounted that it may be moved both vertically and horizontally. A contacting device is attached to the loading pipe carrier, and it includes an operating mechanism that is responsive to the contact pressure between the contacting device and the loading port of the tank car to stop the vertical motion of the loading pipe carrier when sufficient contact pressure is obtained. A liquid level detector attached to the loading pipe carrier is used with a switch system co-operating with the liquid level detector and designed so that when a desired liquid level is reached in the tank, the liquid supply is shut off.

The system according to the invention has the advantage that the tank car can be loaded with the desired quantity of the desired product with a high degree of accuracy, that the personnel need not climb onto the tank car, that overfilling is prevented and that the loading pipe does not rest on the road or rail tank car.

The loading pipe carrier is preferably designed as a suction cap to which a suction line is connected in a manner to carry away vapors escaping from the tank during loading. This provides a simple means of preventing air pollution by gases escaping from the tank.

DETAILED DESCRIPTION OF THE INVENTION

The invention will now be explained with reference to the drawings, wherein.

Figure 1:
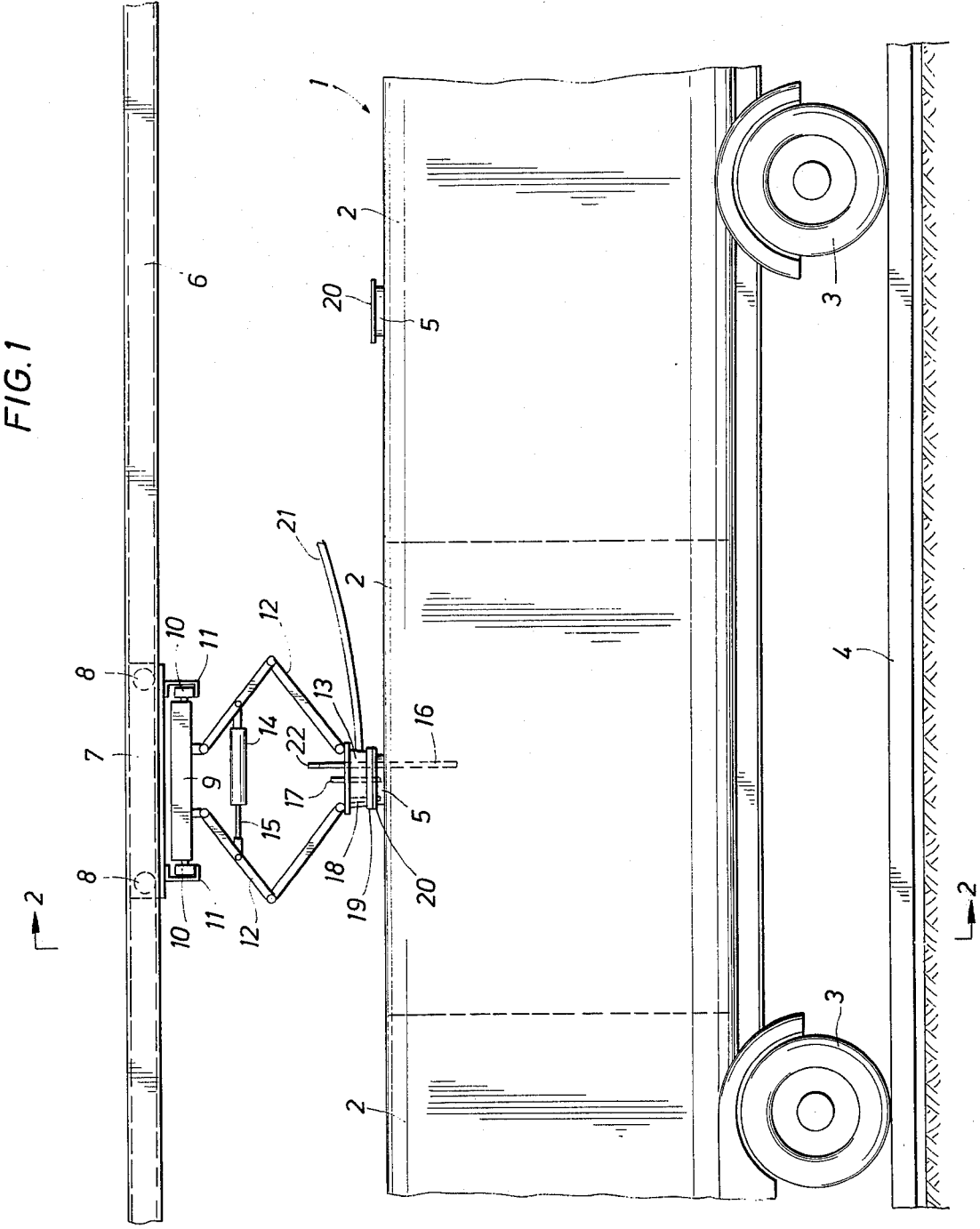
FIG. 1 shows a partial side elevation view of an embodiment of the invention.

The tank car designated by reference numeral 1 is, for example, provided with a number of tank compartments 2. Although the drawings illustrate a road tank car, it is evident that the following description applies equally to a rail tank car. It is, however, pointed out that the tanks in rail tank cars are not normally divided into tank compartments.

The road tank car 1 rests with its wheels 3 on a platform 4. The tank compartments 2 are each provided with a loading manhole 5.

At a height above the platform 4 that is adequate for tank cars to pass under, a pair of horizontal rails 6 is provided. The rails are parallel to the longitudinal axis of the platform 4. A trolley 7 provided with rollers 8 is placed on the rails 6 in such a way that the trolley 7 can be moved along the rails 6 parallel to the longitudinal axis of the platform 4.

A slide 9 is attached to the trolley 7. The slide 9 is provided with rollers 10 which run along horizontal rails 11 attached to the trolley 7. The rails 11 cross the longitudinal axis of the platform 4 perpendicularly.

A linkage arrangement 12, capable of becoming longer or shorter and of a type known in the art, is attached to the slide 9. A loading pipe carrier 13 is attached to the bottom of the linkage arrangement 12. A hydraulically or pneumatically powered cylinder 14 and plunger 15 serve to actuate the linkage arrangement 12, thus permitting the loading pipe carrier 13 to be moved vertically upwards or downwards. Cylinder 14 is supplied with operating fluid from line 25 containing control valve 26.

The loading pipe carrier 13 is provided with an opening in which a loading pipe 16 may be placed and fixed in a detachable manner. The loading pipe is attached to the end of a loading hose 22. A liquiud level detector 17 is attached to the loading pipe carrier 13. A switch system co-operating with the liquid level detector 17 is provided, which system is so designed that when a desired liquid level is reached in the tank compartment 2, the liquid supply via the loading pipe 16 is shut off by closing valve 27.

Preferably there is also a second liquid level detector 18 attached to the loading pipe carrier 13. A switch system co-operating with the second liquid level detector 18 is provided, which system is so designed that when the liquid in tank compartment 2 reaches a certain overfill level, the liquid supply via the loading pipe 16 is shut off. Detector 18 may be arranged to operate valve 27, or it may operate another valve.

The second liquid level detector thus serves as a protection against overfilling. Naturally the first liquid level detector 17 may also serve to prevent overfilling. The liquid level detectors 17 and 18 are preferably of the ultrasonic type. The liquid level detectors 17 and 18 are preferably attached to the loading pipe carrier 13 in such a way as to be vertically adjustable. A contacting ring 19 is also attached to the loading pipe carrier 13. An operating mechanism co-operating with the contacting ring 19 is provided, which mechanism is so designed that at a certain contact pressure between the contacting ring 19 and the flange 20 of the loading manhole 5, the vertical motion of the loading pipe carrier 13 is stopped by closing valve 26 in the line 25 supplying operating fluid to the cylinder 14.

The loading pipe carrier 13 is preferably designed as a suction cap and provided with suction line 21. By this means gases escaping from the tank compartment 2 during loading may be removed, thus preventing environmental pollution.

The operation of the system described above is as follows. A road tank car 1, to be loaded with a liquid product, is driven onto the platform 4. When the road tank car is driven onto the platform 4, the loading pipe carrier 13 is in its highest position. In other words, the linkage arrangement 12 is in the retracted position. Operating personnel standing on the operating platform 23 now move the trolley 7 and the slide 9 until the loading pipe carrier 13 is above a loading manhole 5 of the tank compartment 2 to be loaded. This travel of the trolley 7 and the slide 9 may be effected manually or mechanically, for example by means of electric motors. After the trolley 7 and the slide 9 have been brought into the desired position, they are locked in that position by the operating personnel. This locking may be effected manually or by means of a hydraulic or pneumatic locking system.

Figure 2:
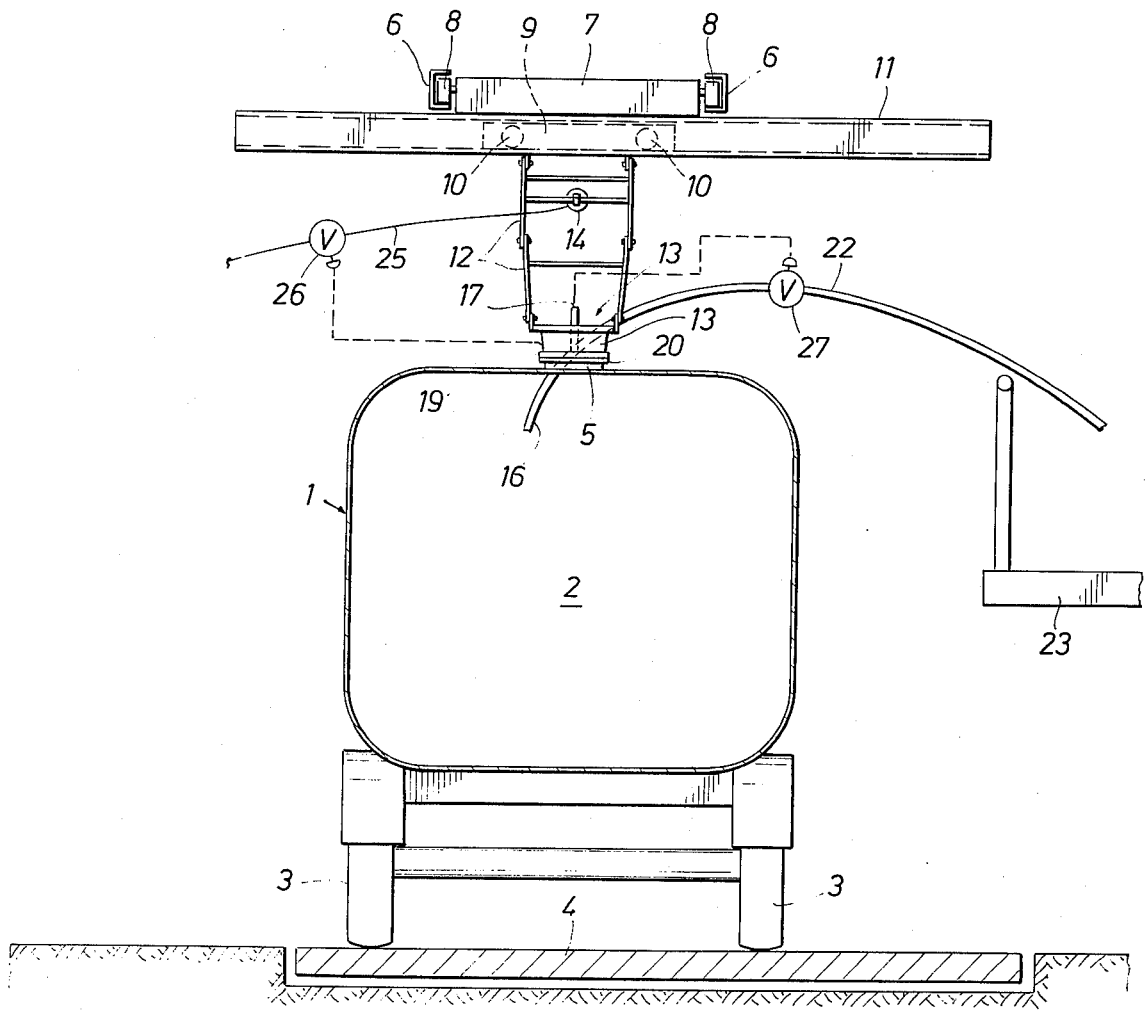
FIG. 2 shows a cross section 2—2 through the embodiment shown in FIG. 1.

The loading pipe carrier 13 is then lowered vertically by actuating the linkage arrangement 12 pneumatically or hydraulically by means of the cylinder 14 and plunger 15. The vertical downwards motion of the loading pipe carrier 13 continues until the contacting ring 19 presses on the flange 20 of the loading manhole 5 with a certain pre-determined pressure. An operating mechanism co-operating with the contacting ring 19 then closes valve 26 in line 25 thereby stopping the hydraulic or pneumatic actuating gear of the linkage arrangement 12. The position then reached by the loading pipe carrier 13 is shown in FIGS. 1 and 2.

The operating personnel standing on the operating platform 23 then select the correct loading hose 22 and loading pipe 16 for the desired liquid product. The personnel then place the loading pipe 16 in the opening of the loading pipe carrier 13. When the loading pipe 16 is in position, it is locked in the loading pipe carrier 13. The locking may be effected manually or hydraulically or pneumatically. After loading pipe 16 is in position, loading can proceed.

The liquid level detector 17, which is preferably of the known ultrasonic type, co-operates with an electronic switch system which is so designed that when the desired liquid level is reached in the tank compartment 2, the liquid supply via the loading pipe 16 is shut off by action of valve 27.

The operating personnel may, if desired, cause the liquid level detector 17 not to operate. A second liquid level detector 18 is preferably also present. This serves to prevent overfilling of the tank compartment 2 under all circumstances. The operating personnel cannot therefore override the second liquid level detector 18. The second liquid level detector 18, which is also preferably of the ultrasonic type, co-operates with an electronic switch system which is so designed that when the maximum admissible level is reached, for example 2 cm below the level of the manhole 5, the supply via the loading pipe 16 is shut off by operation of valve 27 or by operation of a second valve which is not shown.

During loading of the tank compartment 2, gases are forced out by the liquid flowing in. These gases escape from the loading manhole 5. In order to prevent these gases from escaping to the atmosphere, the loading pipe carrier 13 is designed as a suction cap provided with a suction line 21. The escaping gases are removed via the suction line, for example to a gas scrubber or similar unit.

On completing of loading, the loading pipe 16 is removed from the loading pipe carrier 13. The loading pipe carrier 13 is then moved to a high enough position by means of the linkage arrangement 12 to permit clearance of the tank car.

It should be noted that in the case of a rail tank car, the latter does not rest on a platform but on a railway track.

During loading of a tank car, the springs of the tank car will gradually be compressed as the weight of the load increases with the result that the tank will gradually lower. The pressure responsive contact ring 19 will automatically act to maintain the contact pressure between the contacting ring and the tank as the tank fills.

As a safety measure, a suitable interlock preferably is provided to keep the liquid supply valve closed if the contact pressure between the contact ring and the tank is not adequate.

As an additional safety measure, a suitable interlock preferably is provided to keep the liquid supply valve closed if a loading pipe placed in the loading pipe carrier is not fixed by the locking devices provided for that purpose.

In order to prevent movement of the loading pipe carrier in the horizontal plane during loading, a suitable interlock preferably is provided to keep the liquid supply valve closed if the trolley 7 and the slide 9 are not locked against movement.

What is claimed is:

1. An apparatus comprising a support;
   carrier means for receiving and suspending a loading means;
   alignment means connected to the support for aligning the carrier means horizontally over the inlet of a tank car to be loaded, the alignment means being connected to the carrier means through vertically expandable and contractable linking means;
   actuating means for regulating the expansion and contraction of the linking means;
   contacting means connected to the carrier means for achieving contact with the inlet of a tank car to be loaded, the contacting means including sensing means responsive to changes in contact pressure between the contacting means and a tank car being loaded, said sensing means cooperating with said actuating means to regulate the vertical motion of the linking means.

2. An apparatus for loading a tank car with liquid comprising a support;
   carrier means for receiving and suspending a loading means;
   alignment means connected to the support for aligning the carrier means horizontally over the inlet of a tank car to be loaded, the alignment means being connected to the carrier means through vertically expandable and contractable linking means;
   actuating means for regulating the expansion and contraction of the linking means;
   contacting means connected to the carrier means for achieving contact with the inlet of a tank car to be loaded, the contacting means including sensing means responsive to changes in contact pressure between the contacting means and a tank car being loaded, said sensing means cooperating with said actuating means to regulate the vertical motion of the linking means;
   loading means, disposed with the carrier means, for feeding liquid to a tank car;
   liquid level sensing means, disposed with said carrier means, for sensing the level of liquid in a tank car being loaded; means cooperating with the liquid level sensing means to regulate the amount of liquid fed through the loading means to a tank car.

3. The apparatus of claim 2 wherein the carrier means comprises a suction cap.

4. The apparatus of claim 3 wherein the contacting means comprises a contacting ring communicating with the suction cap and the inlet of a tank car to be loaded.

* * * * *